US008053535B2

(12) United States Patent
Boudjouk et al.

(10) Patent No.: US 8,053,535 B2
(45) Date of Patent: Nov. 8, 2011

(54) POLYSILOXANES WITH ANTI-FOULING ACTIVITY

(75) Inventors: Philip Boudjouk, Fargo, ND (US); Thomas Johnson, Fargo, ND (US)

(73) Assignee: NDSU Research Foundation, Fargo, ND (US)

( * ) Notice: Subject to any disclaimer, the term of this patent is extended or adjusted under 35 U.S.C. 154(b) by 939 days.

(21) Appl. No.: 11/827,364

(22) Filed: Jul. 11, 2007

(65) Prior Publication Data

US 2009/0018276 A1    Jan. 15, 2009

(51) Int. Cl.
C08F 283/12    (2006.01)
(52) U.S. Cl. ........................................ 525/479
(58) Field of Classification Search .................. 525/479
See application file for complete search history.

(56) References Cited

U.S. PATENT DOCUMENTS

| | | | |
|---|---|---|---|
| 4,125,491 | A | 11/1978 | Gorman |
| 4,298,543 | A | 11/1981 | Law et al. |
| 4,687,813 | A | 8/1987 | Lenz et al. |
| 4,697,913 | A | 10/1987 | Kuramoto et al. |
| 4,902,767 | A | 2/1990 | Roitman et al. |
| 4,910,252 | A | 3/1990 | Yonehara et al. |
| 5,001,210 | A | 3/1991 | Coury et al. |
| 5,203,991 | A | 4/1993 | Kutsuna et al. |
| 5,237,082 | A | 8/1993 | Leir et al. |
| 5,260,400 | A * | 11/1993 | Karydas .......................... 528/25 |
| 5,986,018 | A | 11/1999 | Yamaguchi et al. |
| 6,369,186 | B1 | 4/2002 | Branlard et al. |
| 6,387,997 | B1 | 5/2002 | Grolemund et al. |
| 6,413,446 | B1 | 7/2002 | Mechtel et al. |
| 6,458,878 | B1 | 10/2002 | Tsuboi et al. |
| 6,482,912 | B2 | 11/2002 | Boudjouk et al. |
| 6,500,549 | B1 | 12/2002 | Deppisch et al. |
| 6,524,564 | B1 | 2/2003 | Kim et al. |
| 6,861,493 | B2 | 3/2005 | Bauer et al. |
| 7,345,131 | B2 | 3/2008 | Selbertinger et al. |
| 7,449,537 | B2 | 11/2008 | Boudjouk et al. |
| 7,452,956 | B2 | 11/2008 | Cheng et al. |
| 7,544,722 | B2 | 6/2009 | Boudjouk et al. |
| 2002/0098214 | A1 | 7/2002 | Adams et al. |
| 2002/0156223 | A1 | 10/2002 | Boudjouk et al. |
| 2003/0022793 | A1 | 1/2003 | Ring et al. |
| 2003/0129421 | A1 | 7/2003 | Terauchi et al. |
| 2003/0207962 | A1 | 11/2003 | Oya et al. |
| 2003/0236552 | A1 | 12/2003 | Roby |
| 2005/0009985 | A1 | 1/2005 | Selbertinger et al. |
| 2005/0129962 | A1 | 6/2005 | Amidaiji et al. |
| 2005/0227092 | A1 | 10/2005 | Yamaya et al. |
| 2006/0014015 | A1 | 1/2006 | Travelute et al. |
| 2006/0223969 | A1 | 10/2006 | Roesler et al. |
| 2006/0252094 | A1 | 11/2006 | Zhou et al. |
| 2006/0276608 | A1 | 12/2006 | Lang et al. |
| 2007/0021529 | A1 | 1/2007 | Boudjouk et al. |
| 2007/0032626 | A1 | 2/2007 | Roesler et al. |
| 2007/0042199 | A1 | 2/2007 | Chisholm et al. |
| 2007/0048344 | A1 | 3/2007 | Yahiaoui et al. |
| 2007/0093618 | A1 | 4/2007 | Cheng et al. |
| 2007/0112161 | A1 | 5/2007 | Roesler et al. |
| 2007/0112164 | A1 | 5/2007 | Roesler et al. |
| 2007/0129474 | A1 | 6/2007 | Salamone et al. |
| 2007/0132949 | A1 | 6/2007 | Phelan |
| 2008/0181862 | A1 | 7/2008 | Chisholm et al. |
| 2008/0213599 | A1 | 9/2008 | Webster et al. |
| 2009/0018276 | A1 | 1/2009 | Boudjouk et al. |
| 2009/0111937 | A1 | 4/2009 | Webster et al. |
| 2009/0143496 | A1 | 6/2009 | Ziche |
| 2009/0215762 | A1 | 8/2009 | Stafslien et al. |
| 2010/0004202 | A1 | 1/2010 | Chisholm et al. |
| 2010/0204399 | A1 | 8/2010 | Chisholm et al. |
| 2010/0280148 | A1 | 11/2010 | Webster et al. |

FOREIGN PATENT DOCUMENTS

| | | |
|---|---|---|
| CA | 2 413 672 A1 | 8/2003 |
| CA | 2621000 | 3/2007 |
| EP | 1 496 079 A1 | 1/2005 |
| JP | 2-47371 A | 2/1990 |
| WO | WO 2005/030405 | 4/2005 |
| WO | PCT/US2006/029035 | 7/2006 |
| WO | WO 2006/086092 | 8/2006 |
| WO | WO 2006/121937 A1 | 11/2006 |
| WO | WO 2007/053163 A2 | 4/2007 |
| WO | WO 2008/008077 A2 | 1/2008 |
| WO | WO 2009/025924 A2 | 2/2009 |

OTHER PUBLICATIONS

Holohan, Aidan T., et al., "Monofunctional polydimethylsiloxane pligomers for graft copolymerization", *Macromol. Chem. Phys.*, vol.-Issue 195, 1994, (pp. 2965-2979).
Kawakami, Yuhsuke, et al., "Silicone Macromers for Graft Polymer Synthesis", *Polymer Journal*, vol. 14, No. 11, 1982 (pp. 913-917).
Pike, John K., et al., "Water-Induced Surface Rearrangements of Poly(dimethylsiloxane-urea-urethane) Segmented Block Copolymers", *Chem. Mater.*, vol. 8, No. 4, 1996 (pp. 856-860).
Abstract for Japanese Publication No. 04-370163, "Coating Composition", date of publication Dec. 22, 1992 (1 page).
Abstract for Japanese Publication No. 63-277222, "Curing Resin", date of publication Nov. 15, 1988 (1 page).
Abstract for Japanese Publication No. 63-270738, "Polyamine/Polysiloxane Block Copolymer", date of publication Nov. 8, 1988 (1 page).
Abstract for Japanese Publication No. JP 04-370163 A, "Coating Composition", date of publication Dec. 22, 1992 (1 pg.).
Abstract for Japanese Publication No. JP 63-277222 A, "Curing Resin", date of publication Nov. 15, 1998 (1 pg.).
Majumdar et al., "Influence of Solvent Composition and Degree of Reaction on the Formation of Surface Microtopography in a Thermoset Siloxane-Urethane System," *Polymer*, 47, 4172-4181 (2006).
U.S. Appl. No. 12/633,334, filed Dec. 7, 2009, Webster et al.
U.S. Appl. No. 60/934,093, filed Jun. 11, 2007, Webster et al.

(Continued)

*Primary Examiner* — Kuo-Liang Peng
(74) *Attorney, Agent, or Firm* — Foley & Lardner LLP

(57) ABSTRACT

Anti-fouling materials may include one or more of a number of suitable copolymers (e.g., block copolymers, graft copolymers, etc.) which provide biocidal and/or fouling release characteristics. The copolymers may include a polysiloxane backbone with one or more polymers grafted onto the polysiloxane backbone.

24 Claims, 6 Drawing Sheets

OTHER PUBLICATIONS

U.S. Appl. No. 11/810,696, filed Jun. 6, 2007, Webster et al.
Abstract for Japanese Publication No. JP 11-222402, Publication Date Aug. 17, 1999, Patentee or Applicant listed as Osaka Gas Co. Ltd., 1 page.
Abstract for JP 2000-264803, "Silver Microbide-Containing Photopolymerizable Monomer Compositions, and Solventless UV- or Electron Beam-Curable Resin Compositions Containing Them," Takeuchi et al., publication date Sep. 26, 2000, 1 page.
Abstract for JP 2003-327912, "Primer Antifouling Coating Material Composition for Ship, Composite Antifouling Coating Film for Ship, Method for Forming the Composite Antifouling Coating Film, Ship Coated with the Composite Antifouling Coating Film and Antifouling Method for Outer Hull of Ship", Masuda Hiroshi et al., publication date Nov. 19, 2003 (1 page).
Abstract for JP 2007246576 (A), "Water Paint Composition," Matsushita et al., publication date Sep. 27, 2007, 1 page.
Abstract for JP 51-17554, "UV-Curable Antimicrobial Acrylic Coating Materials," Honda et al., publication date May 14, 1993, 1 page.
Abstract for JP 53-139653, "Marine Antifouling Material," Takamizawa Minoru et al., publication date Dec. 6, 1978, 1 page.
Abstract for JP 60-09919, "Crosslinked Urethane Acrylate Polymer Particle-Containing Antimicrobial Coatings," Honda et al., publication date Jan. 18, 1994, 1 page.
Abstract for JP 63-270738, "Polyamine/Polysiloxane Block Copolymer", Tezuka Yasushi et al., publication date Nov. 8, 1988, 1 page.
Adhikari et al., "Mixed Macrodiol-Based Siloxane Polyurethanes: Effect of the Comacrodiol Structure on Properties and Morphology," *Journal of Applied Polymer Science*, 2000, vol. 78, pp. 1071-1082.
Bullock et al., "Surface Science of a Filled Polydimethylsiloxane-Based Alkoxysilane-Cured Elastomer: RTV11[1]," *Journal of Colloid and Interface Science*, 1999, vol. 210, pp. 18-36, Article ID jcis.1998.5856, available online at http://www.idealibrary.com.
Cassé et al., "Laboratory screening of coating libraries for algal adhesion," *Biofouling*, 2007, vol. 23, Nos. 3/4, pp. 267-276.
Chen et al., "Solvent Effects on the Surface Composition of Poly(dimethylsiloxane)-co-Polystyrene/Polystyrene Blends," *Macromolecules*, 1998, vol. 31, No. 26, pp. 9328-9336.
Ekin et al., "Combinatorial and High-Throughput Screening of the Effect of Siloxane Composition on the Surface Properties of Crosslinked Siloxane-Polyurethane Coatings," *J. Comb. Chem.*, 2007, vol. 9, No. 1, pp. 178-188.
Ekin et al., "Library Synthesis and Characterization of 3-Aminopropyl-Terminated Poly(dimethylsiloxane)s and Poly(ε-caprolactone)-b-Poly(dimethylsiloxane)s," *Journal of Polymer Science: Part A: Polymer Chemistry*, 2006, vol. 44, No. 16, pp. 4880-4894.
Ekin et al., "Synthesis and Characterization of Novel Hydroxyalkyl Carbamate and Dihydroxyalkyl Carbamate Terminated Poly(dimethylsiloxane) Oligomers and Their Block Copolymers with Poly(ε-caprolactone)," *Macromolecules*, 2006, vol. 39, No. 25, pp. 8659-8668.
Ekin et al., "Synthesis, formulation, and characterization of siloxane-polyurethane coatings for underwater marine applications using combinatorial high-throughput experimentation," *J. Coat. Technol. Res.*, 2007, vol. 4, No. 4, pp. 435-451.
El-Hayek et al., Bacteriostatic polymer film immobilization. *Journal of biomedical materials research*. Part A 2006, vol. 79 No. 4, pp. 874-881 (Plus Cover Sheet, 9 pages total).
Iojoiu et al., "Modified poly (ε-caprolactone)s and their use for drug-encapsulating nanoparticles," Journal of Polymer Science Part A: Polymer chemistry, 2004, vol. 42, No. 3, pp. 689-700.
Jiang et al., Preparation of crosslinked polystyrenes with quaternary ammonium and their antibacterial behavior *Reactive & Functional Polymers* 2005, vol. 62, 5 pages.
Johnston et al., "Networks from α,ω-Dihydroxypoly(dimethylsiloxane) and (Tridecafluoro-1,1,2,2-tetrahydrooctyl)triethoxysilane: Surface Microstructures and Surface Characterization," *Macromolecules*, 1999, vol. 32, No. 24, pp. 8173-8182.
Karal et al., "Blend of polycaprolactone-poly (dimethylsiloxane)-polycaprolactone triblock copolymer with poly(vinyl chloride) preparation and characterization," Polymer, 1997, vol. 38, No. 24, pp. 6071-6078.
Lenoir et al., Antimicrobial activity of polystyrene particles coated by photo-crosslinked block copolymers containing a biocidal polymethacrylate block. e-Polymers 2005, 11 pages.
Majumdar et al., "Thermoset Siloxane-Urethane Fouling Release Coatings," *A.C.S. Symposium Series*, 2007, vol. 957, pp. 61-75.
Pieper et al., "Combinatorial approach to study the effect of acrylic polyol composition on the properties of crosslinked siloxane-polyurethane fouling-release coatings," *J. Coat. Technol. Res.*, 2007, vol. 4, No. 4, pp. 453-461.
Schweizer, Triclosan: a widely used biocide and its link to antibiotics. *FEMS Microbiology Letters*, 2001, vol. 202, No. 1, pp. 1-7 (Plus Cover Sheet, 9 pages total).
Smetankina et al., "Reactivity of organosilicon diisocyanates," XVII, Carcofunctional organosilicon compounds, Zhurnal Obshchei Khimii, 1974, vol. 44, No. 12, pp. 2638-2641.
Stafslien et al., "Combinatorial materials research applied to the development of new surface coatings IV. A high-throughput bacterial biofilm retention and retraction assay for screening fouling-release performance of coatings," *Biofouling*, 2007, vol. 23, No. 1, pp. 45-54.
Tang et al., "Anti-inflammatory properties of triblock siloxane copolymer-blended materials," Biomaterials, 1999, vol. 20, pp. 1365-1370.
Tezuka et al., "Environmentally induced Macromolecular Rearrangement on the Surface of Polyurethane-Polysiloxane Block Copolymers," *J. Chem. Soc. Paraday Trans.*, 1991, vol. 87, pp. 147-152.
Tezuka et al., "Environmentally Induced Macromolecular Rearrangement on the Surface of Polyurethane-Polysiloxane Graft Copolymers," *Journal of Colloid and Interface Science*, May 1990, vol. 136, No. 2, pp. 408-414.
Thomas et al., "Silicones Containing Pendant Biocides for Antifouling Coatings," *Biofouling*, vol. 20, Nos. 4/5, Aug./Oct. 2004, pp. 227-236.
Wynne et al., "Poly(dimethysiloxane)-Urea-Urethane Copolymers," Synthesis and Surface Properties, Chapter 7, Ingoranic and Organometallic Polymers II, *Am. Chem. Soc.*, 1994, pp. 64-80.
Yilgor et al., "Novel triblock siloxane copolymer: Synthesis, characterization, and their use as surface modifying additives," Journal of Polymer Science Part A: Polymer chemistry, 1989, pp. 3673-3690.
Zhuang et al., "Determination of the Distribution of Poly(dimethylsiloxane) Segment Lengths at the Surface of Poly[(dimethylsiloxane)-urethane]-Segmented Copolymers by Time-of-Flight Secondary Ion Mass Spectrometry," *Macromolecules*, 1997, vol. 30, No. 4, pp. 1153-1157.
U.S. Appl. No. 12/378,155, filed Feb. 11, 2009, Chisholm et al.
U.S. Appl. No. 12/378,049, filed Feb. 10, 2009, Stafslien et al.
Majumdar et al., "Preparation of Siloxane-Urethane Coatings Having Spontaneously Formed Stable Biphasic Microtopographical Surfaces," *Macromolecules*, 2005, vol. 38, pp. 5857-5859.
Chen, X; Gardella, J.A., Jr; Ho, T.; Wynne, K. J., "*Macromolecules*", 1995, 28, 1635-1642.
Ha, C.-S.; Gardella, J.A.,Jr., *Journal of Macromolecular Science, Polymer Reviews*, 2005, C45, 1-18.
Ho, T,; Wynne, K. J.; Nissan, R.A.; *Macromolecules*, 1993, 26, 7029-7036.
Lee, Y.; Akiba, I.; Akiyama, S., *Journal of Applied Polymer Science*, 2003, 87, 375-380.
Mahoney, C.M.; Gardella, J. A., Jr.; Rosenfeld, J. C., *Macromolecules*, 2002, 35, 5256-5266.
Patel, N. M.; Dwight, D. W.; Hedrick, J. L.; Webster, D. C.; McGrath, J. E., *Macromolecules*, 1988, 21, 2689-2696.
Smith, S. D.; Desimone, J.M.; Huang, H.; York, G.; Dwight, D. W.; Wilkes, G. L., McGrath, J. E., *Macromolecules*, 1992, 25, 2575-2581.
Tanaka, H.; Hideme, T.; Atsunori, T.; Takafumi, H.; Toshio, N., *Physical Review Letters*, 1992, 68(18), 2794-2797.
Wynne, K. J.; Ho, T.; Nissan, R. A.; Chen, X.; Gardella, J. A., Jr., *ACS Symposium Series*, 1994, 572, 64-80.

* cited by examiner

POLYSILOXANES WITH ANTI-FOULING ACTIVITY

GOVERNMENT RIGHTS STATEMENT

This invention was made with government support under Grant Nos. N00014-02-1-0794, N00014-03-1-0702 and N00014-04-1-0597, awarded by the Department of Defense Office of Naval Research. The government has certain rights in the invention.

CROSS-REFERENCE TO RELATED PATENT APPLICATIONS

This application claims priority to U.S. Provisional Patent Application Ser. No. 60/645,216, entitled "Polysiloxanes With Anti-Fouling Activity," filed on Jan. 19, 2005, and to U.S. Provisional Patent Application Ser. No. 60/678,883, entitled "Polysiloxanes With Anti-Fouling Activity," filed on May 6, 2005, and International Patent Application Serial No. PCT/US2006/000120, filed on Jan. 4, 2006, entitled "Polysiloxanes With Anti-Fouling Activity," all of which are expressly incorporated herein by reference in their entireties, as if the complete and entire text and figures, had been included herein.

BACKGROUND

Fouling of surfaces exposed to an aquatic environment is a serious problem. For example, surfaces of ships such as the hull, offshore marine structures such as oil rigs, sea water conduit systems for seaside plants, buoys, heat-exchangers, cooling towers, de-salination equipment, filtration membranes, docks, and the like may all experience some degree of fouling when continually exposed to water. In the case of ships, fouling can inhibit vessel performance and capabilities. For example, fouling may substantially increase fuel consumption and may necessitate extensive and more frequent maintenance, all of which raise the overall costs of operation. Fouling may also reduce ship speed, maneuverability, and range, which impede performance. On another level, attachment of regionally specific aquatic organisms on ships that traverse the world can lead to the unwanted invasion and infestation of these organisms to non-indigenous harbors. In some instances, this can have severe adverse effects on local aquatic ecosystems.

Over the years there have been numerous attempts to minimize the effect of fouling on structures exposed to an aquatic environment. For example, coatings (e.g., paints, etc.) have been developed that impede the attachment and/or growth of aquatic organisms on such structures. Traditionally, two parallel lines of coatings research have predominated: biocide containing coatings and low surface energy, "non-stick," fouling release coatings.

Unfortunately, certain biocidal coatings have been linked to environmental problems (e.g., tin based biocidal coatings, etc.). For example, while moored in harbors, paint chips and leaching have led to sediment accumulations of toxins resulting in harm or destruction of non-targeted sea life (e.g., oysters). Therefore, it would be desirable to provide an improved antifouling coating that is more environmentally sensitive and/or is more effective at inhibiting fouling.

SUMMARY

In one embodiment, an anti-fouling material comprises a copolymer having the formula:

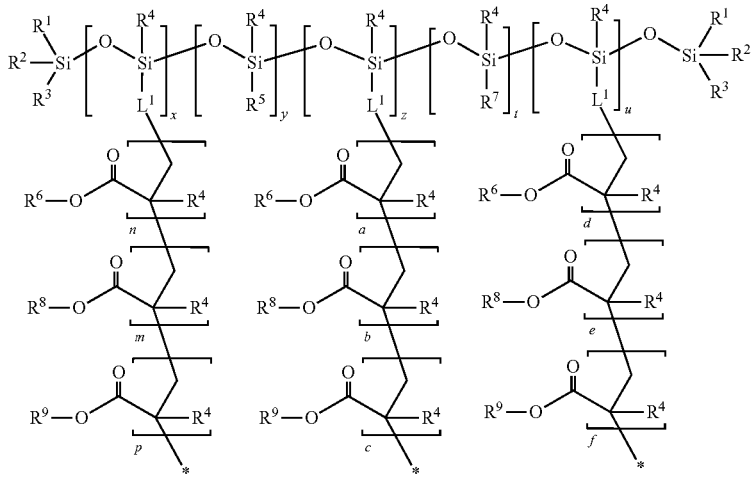

wherein x is an integer from 0 to 100;
y is an integer from 0 to 100;
z is an integer from 0 to 100;
t is an integer from 0 to 100;
u is an integer from 0 to 100;
n is an integer from 0 to 50;
m is an integer from 0 to 50;
p is an integer from 0 to 50;
a is an integer from 0 to 50;
b is an integer from 0 to 50;
c is an integer from 0 to 50;
d is an integer from 0 to 50;
e is an integer from 0 to 50;
f is an integer from 0 to 50;
at least one of x, z, or u is not 0;
at least one of n, m, or p is not 0;
at least one of a, b, or c is not 0;
at least one of d, e, or f is not 0;
$L^1$ is a linking groups;
$R^1$, $R^2$, and $R^3$, are independently $C_1$-$C_{10}$ alkyl, cyclopentyl, cyclohexyl, benzyl, toluoyl, xylyl or phenyl;

R⁴ is hydrogen, $C_1$-$C_{10}$ alkyl, cyclopentyl, cyclohexyl, benzyl, toluoyl, xylyl or phenyl;

R⁵ is $C_1$-$C_{10}$ alkyl, cyclopentyl, cyclohexyl, benzyl, toluoyl, xylyl, phenyl, or a cross linking group;

R⁷ is hydrogen, $C_1$-$C_{10}$ alkyl, cyclopentyl, cyclohexyl, benzyl, toluoyl, xylyl, phenyl, or a cross linking group;

R⁶, R⁸, and R⁹ include independently a biocidal group that is toxic to organisms that cause fouling in an aquatic environment; a fouling release group; a texturizing group; or combination thereof.

In the embodiment shown previously, the polysiloxane backbone may be a random or block copolymer. Also, the polymethacrylate based polymer grafted to the polysiloxane backbone may be a random or block copolymer. Accordingly, the formulas shown herein should be understood to refer to either a block or random copolymer having the specified monomer units in any order.

In another embodiment, an anti-fouling material comprises a random or block copolymer having a formula:

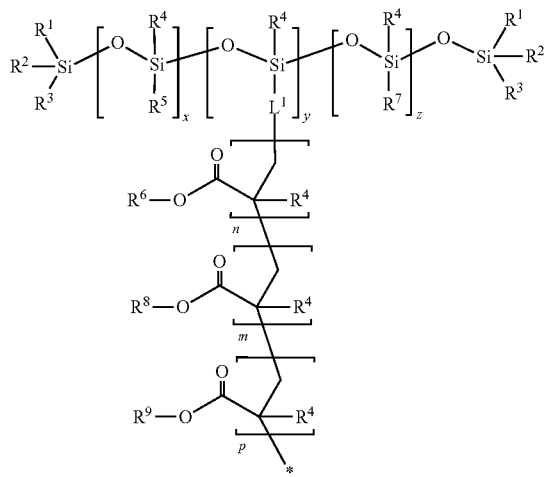

wherein x is an integer from 0 to 100;
y is an integer from 1 to 100;
z is an integer from 0 to 100;
n is an integer from 0 to 50;
m is an integer from 0 to 50;
p is an integer from 0 to 50;
v is an integer from 1 to 25;
at least one of n, m, or p is not 0;
$L^1$ and $L^2$ are linking groups;
R¹, R², and R³, are independently $C_1$-$C_{10}$ alkyl, cyclopentyl, cyclohexyl, benzyl, toluoyl, xylyl or phenyl;

R⁴ is hydrogen, $C_1$-$C_{10}$ alkyl, cyclopentyl, cyclohexyl, benzyl, toluoyl, xylyl or phenyl;

R⁵ is $C_1$-$C_{10}$ alkyl, cyclopentyl, cyclohexyl, benzyl, toluoyl, xylyl, phenyl, or a cross linking group;

R⁷ is hydrogen, $C_1$-$C_{10}$ alkyl, cyclopentyl, cyclohexyl, benzyl, toluoyl, xylyl, phenyl, or a cross linking group;

R⁶, R⁸, and R⁹ include independently a biocidal group that is toxic to organisms that cause fouling in an aquatic environment; a fouling release group; a texturizing group; or combination thereof; and wherein at least one of R⁶, R⁸, and R⁹ includes the biocidal group, the fouling release group, or the texturizing group and another one of R⁶, R⁸, and R⁹ includes one of the remaining groups from the biocidal group, the fouling release group, or the texturizing group.

A number of compounds suitable for use as or in anti-fouling materials are disclosed herein. In general, anti-fouling materials refer to products, agents, or compositions which may provide biocidal and/or fouling release properties when used alone or in combination with other materials or substances. The anti-fouling materials described herein may include one or more of a number of suitable copolymers (e.g., block copolymers, graft copolymers, etc.) which provide biocidal and/or fouling release characteristics. In one embodiment, a graft copolymer may be prepared that has a polysiloxane copolymer (random or block) attached to a polymethacrylate copolymer (random or block). In one embodiment, the polymethacrylate copolymer may include biocidal groups, fouling release groups, and/or texturizing groups. In another embodiment, the polysiloxane copolymer is attached to multiple polymethacrylate copolymers, each of which may have one or more of a texturizing group, foul release group, or biocidal group. The texturizing and/or fouling release groups enhance the texture or fouling release properties of the copolymer and/or the final product which incorporates the copolymer. It may also be desirable to include functional groups which are capable of serving as sites for cross-linking reactions in the copolymer. Typically, the cross linking groups are provided on the polysiloxane copolymer (e.g., H group). However, in other embodiments, the cross linking groups may be included as part of the polymethacrylate copolymer. The copolymers may have a molecular weight from 5,000 to 50,000, or, desirably, 10,000 to 25,000. The polysiloxane copolymer may include two or more blocks where each block contains about 10 to 100 subunits.

DETAILED DESCRIPTION

Figure 1:
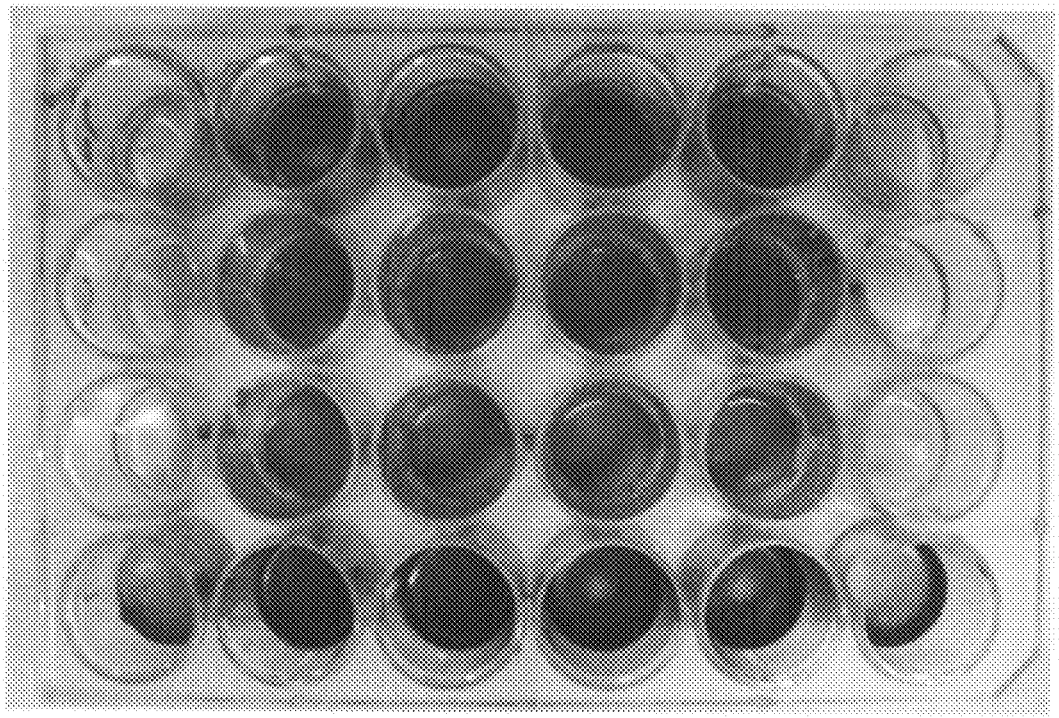
FIG. 1 is a picture of a bacterial assay of a PDMS coating.

Generally, the antifouling materials described herein comprise functionalized polysiloxanes and/or salts thereof that exhibit biocidal and/or fouling release activity. The various embodiments and descriptions of antifouling materials may be used independently (e.g., as a single coating layer) or in combination with other materials (e.g., paint pigment, etc.) to prevent structures and other surfaces exposed to an aquatic environment (e.g., marine environments, freshwater environments, etc.) from fouling. In many situations, the composition of the coating material includes other compounds such as curing agents, crosslink initiators, and the like.

Formulas I, II and III show embodiments of a functionalized polysiloxane copolymer, a functionalized polysiloxane block copolymer, and a functionalized polysiloxane homopolymers, respectively. As shown in Formulas I, II and III, the various embodiments of functionalized polysiloxane polymers typically comprise the following the moieties: a crosslinking moiety (e.g., epoxy, olefin, amine, acid, aldehyde, ester, etc.), a biocidal moiety (e.g., Triclosan, quaternary ammonium, pyridinium, polymers and copolymers such as polymethacrylate that include these groups, etc.), a fouling release or textural moiety (e.g., hydrophilic groups such as polyether groups, hydrophobic groups such as perfluoroalkyl groups, liquid crystalline groups such as deuterobenzene groups, self-organizing groups, polymers and copolymers such as polymethacrylate including these groups, etc.), or a texturizing moiety (e.g., alkoxy alkyl groups such as alkoxy alkyl functional polymethacrylate (either polymer or copolymer), etc.).

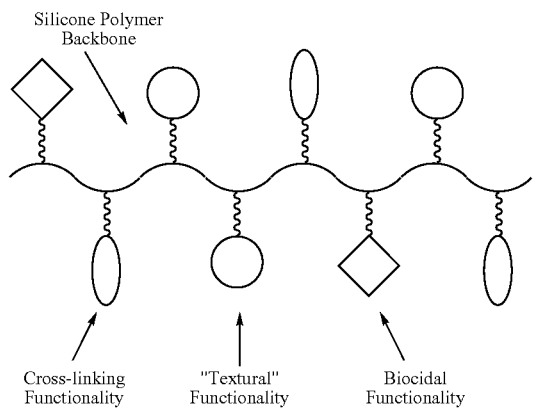

Formula I

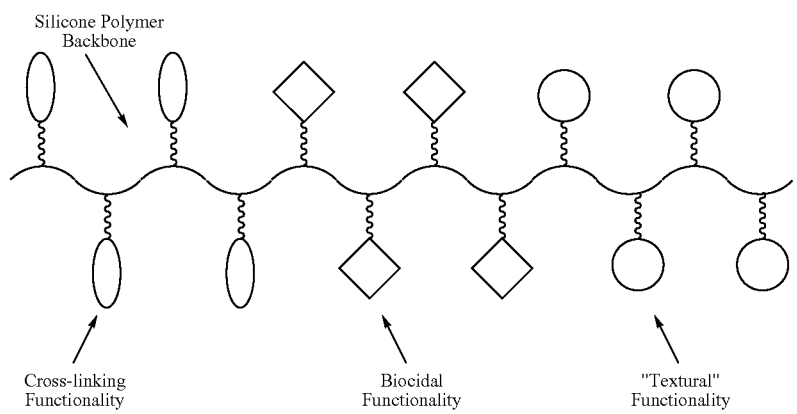

Formula II

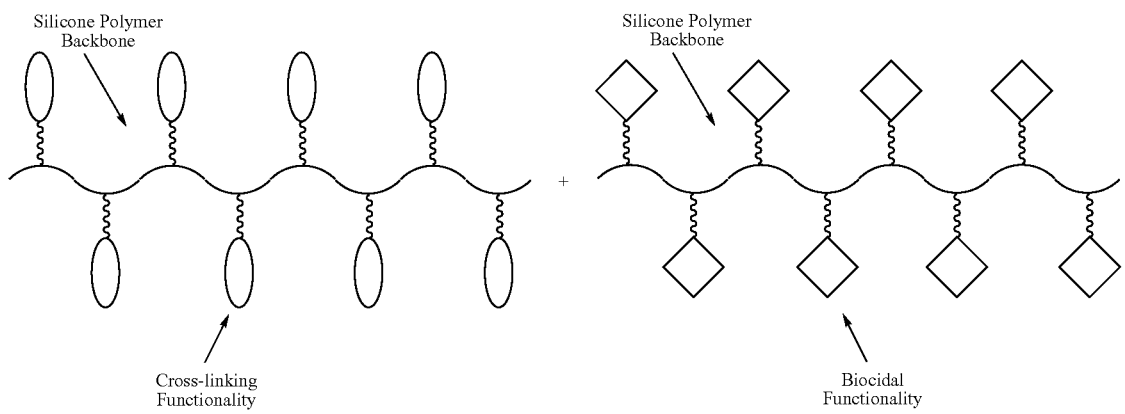

Formula III

-continued

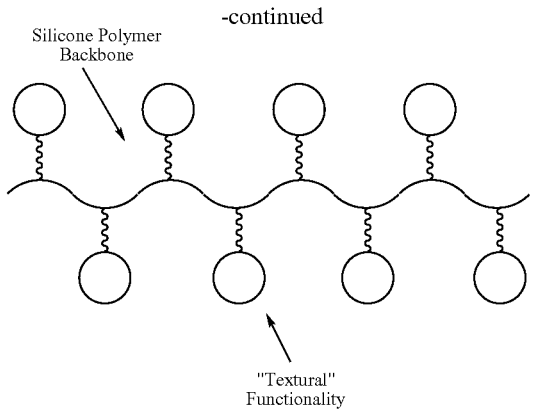

Silicone Polymer Backbone

"Textural" Functionality

The functionalized polysiloxanes shown in Formulas I, II and III may be combined in a number of ways to provide various embodiments of antifouling materials. For example, in one embodiment, the functionalized polysiloxanes may be crosslinked (e.g., polysiloxanes of Formulas I crosslinked with other polysiloxanes of Formula I, etc.; polysiloxanes of one of Formulas I, II, or III crosslinked with polysiloxanes of one or both of the remaining polysiloxanes, etc.). In another embodiment, polysiloxanes of Formulas I, II and III may be blended (i.e., physically mixed) together. Of course, any of the crosslinked polysiloxanes may be blended with other crosslinked polysiloxanes. There are numerous ways in which the polysiloxanes may be combined to provide suitable antifouling materials.

The functionalized polysiloxanes and/or polymethacrylates in the copolymer may include a pendant crosslinking moiety. Suitable examples of such crosslinking moieties include groups having Formula I:

$R^{15} = $ ——A——E

Formula I wherein is "A" is a spacer consisting of alkyl, ether, ester, polyether, phenyl, aryl, heterocyclic, polyaromatic, polypeptide, polysiloxane, polyamide, polysulfone, or polyurethane group. "E" is a terminal functionality consisting of an epoxy, hydroxy, amino, carboxylic, ester, capable of undergoing further reaction when brought into contact with a curing agent.

The functionalized polysiloxanes and/or polymethacrylates in the copolymer may include a pendant biocidal moiety. Suitable examples of such biocidal moieties include groups having Formula II:

$R^{25} = $ ——A——G

Formula II wherein is "A" is a spacer consisting of alkyl, ether, ester, polyether, phenyl, aryl, heterocyclic, polyaromatic, polypeptide, polysiloxane, polyamide, polysulfone, or polyurethane group. "G" is a terminal functionality which is a biocide for aquatic organisms such as in one embodiment, tetracyclines, triclosans, and floxacins, or, in another embodiment, ammonium salts and pyridinium salts. As mentioned previously, the spacer "A" may be selected so that it hydrolyzes and the biocide group "G" is therefore cleavable from the polysiloxane and/or polymethacrylate. Also, the spacer "A" may be chosen so that it does not undergo hydrolysis and thus the biocide group "G" is not cleavable from the polysiloxane. In one embodiment, the polysiloxane and/or the polymethacrylate includes both cleavable and non-cleavable biocide groups. In another embodiment, one compound of polysiloxane includes cleavable biocide groups and is crosslinked to other polysiloxanes, at least one of which includes non-cleavable biocide groups. Suitable examples of biocide groups include triclosan and pyridinium groups, as shown below, respectively:

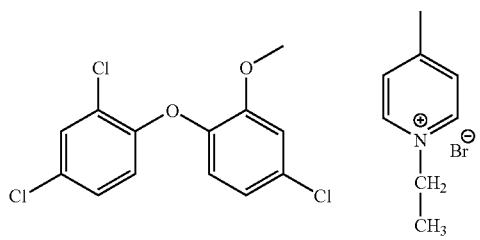

The functionalized polysiloxanes and/or polymethacrylates in the copolymer may include a pendant fouling release moiety. Suitable examples of such fouling release moieties include groups having Formula III:

$R^{35} = $ ——A——J

Formula III wherein is "A" is a spacer consisting of alkyl, ether, ester, polyether, phenyl, aryl, heterocyclic, polyaromatic, polypeptide, polysiloxane, polyamide, polysulfone, or polyurethane group. "J" is a terminal functionality which affects the physical properties of the polysiloxane to enhance the fouling release action as described herein such as perfluoroalkyl. Suitable examples of "J" groups include:

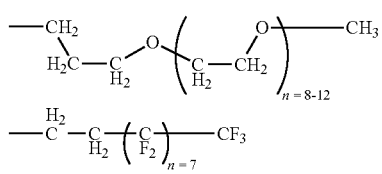

The copolymer may be cross linked using any of a number of cross linking agents such as those having two vinyl groups (e.g., divinyl PDMS, divinyl benzene, etc.). In addition, the contact angle of the copolymer may be at least 105 degrees, 110 degrees, 115 degrees.

The present compositions may be used as an antifouling coatings having biocidal activity and/or fouling release activity. These coatings are more or less effective at inhibiting settlement/growth/proliferation of biological entities on the coated surface. The functionalized polysiloxane compositions can be used in conjunction with other materials to comprise formulations for use in the antifouling coatings. It is anticipated that the formulation can be used to serve as antifouling coatings in a number of applications. In particular, as mentioned previously, the present compositions may be useful for the coating of ship hulls, heat-exchangers, cooling towers, de-salination equipment, filtration membranes, docks, off-shore oil rigs, and other submerged superstructures as well as any structure or surface subject to fouling in an aquatic environment.

This patent application is related to U.S. Provisional Patent Application Ser. No. 60/506,077, filed on Sep. 25, 2003, entitled "Antifouling Materials," U.S. Provisional Patent Application Ser. No. 60/580,834, filed on Jun. 18, 2004, entitled "Anti-fouling Materials," and International Patent Application Serial No. PCT/US04/31140, filed on Sep. 23, 2004, entitled "Antifouling Materials," all of which are expressly incorporated herein by reference in their entireties, as if the complete and entire text, figures, etc. had been included herein.

EXAMPLES

General Synthetic Strategy of Graft Copolymers

Synthesis of Polydimethyl Siloxane-co-Polymethylhydrosiloxane-g-Polytriclosan Methacrylate

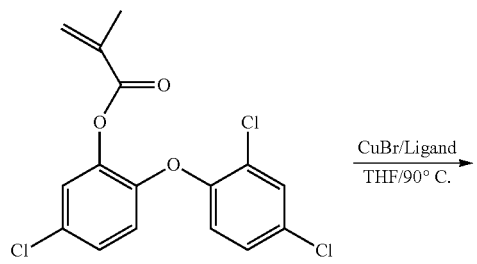

Compounds

1) PDMS-co-PMHS-g-PMEMA (Polydimethyl-co-polyhydromethylsiloxane-g-Polymethoxy Ethyl Methacrylate)

Synthesis Procedure

HMS-82Br, 26 g was dissolved in 150 ml of dry THF in a schlenk flask and 8.3 ml of methoxy ethyl methacrylate was added to that followed by 0.41 g copper (I) bromide and 0.6 ml of pentamethyldiethylene triamine. The mixture was subjected to three freeze-thaw pump cycle and then allowed to polymerize at 90° C. for 72 h. After the reaction, the polymerization was stopped by precipitating the mixture in methanol. Copper was removed by passing the polymer through a neutral alumina column.

Number average molecular weight, Mn=15500.

This polymer was then cross linked with divinyl polydimethyl siloxane, Mn=9000 using platinum catalyst to make the coating.

2) PDMS-co-PMHS-g-PMEMA-b-Biocide (Polydimethyl-co-polyhydromethylsiloxane-g-Polymethyoxy Ethyl Methacrylate-b-Polytriclosan Methacrylate)

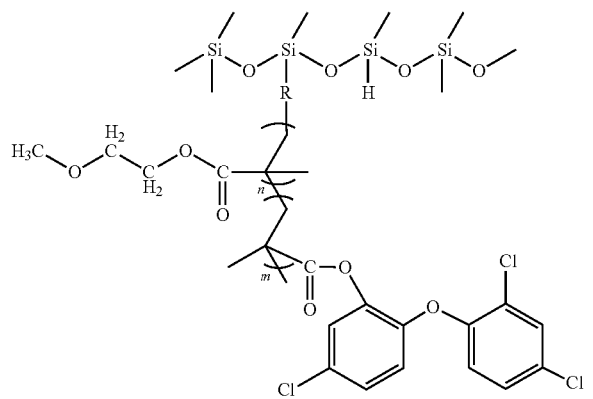

Synthesis Procedure

HMS-82Br, 20 g was dissolved in 150 ml of dry THF in a schlenk flask and 6.4 ml of Methoxy ethyl methacrylate was added to that followed by 0.32 g copper (I) bromide and 0.46 ml of pentamethyldiethylene triamine. The mixture was subjected to three freeze-thaw pump cycle and then allowed to polymerize at 90° C. for 72 h. After 72 h, 15.7 g methacrylate functionalized triclosan (biocide) was added to the reaction mixture under nitrogen and the polymerization continued for another 72 h. The reaction was stopped by precipitating the mixture in methanol. Copper was removed by passing the polymer through a neutral alumina column.

Number average molecular weight, Mn=21000.

This polymer was then cross linked with divinyl polydimethyl siloxane, Mn=9000 using platinum catalyst to make the coating.

3) PDMS-co-PMHS-g-PHDFMA (Polydimethyl-co-polyhydromethylsiloxane-g-polyheptadecafluoro Decyl Methacrylate)

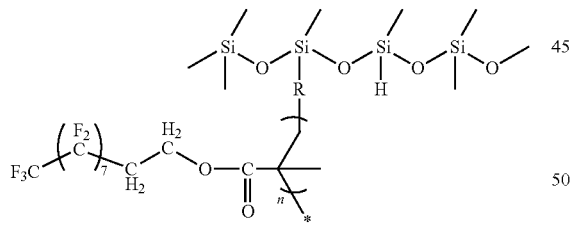

Synthesis Procedure

HMS-82Br, 20 g was dissolved in 150 ml of dry THF in a schlenk flask and 7.4 ml of heptadecafluoro decyl methacrylate was added to that followed by 0.32 g copper (I) bromide and 0.46 ml of pentamethyldiethylene triamine. The mixture was subjected to three freeze-thaw pump cycle and then allowed to polymerize at 90° C. for 8 h. After the reaction, the polymerization was stopped by precipitating the mixture in methanol. Copper was removed by passing the polymer through a neutral alumina column.

Number average molecular weight, Mn=14000.

This polymer was then cross linked with divinyl polydimethyl siloxane, Mn=9000 using platinum catalyst to make the coating.

4) PDMS-co-PMHS-g-PHDFMA-b-Biocide (Polydimethyl-co-polyhydromethylsiloxane-g-polyheptadecafluoro Decyl Methacrylate-b-Polytriclosan Methacrylate)

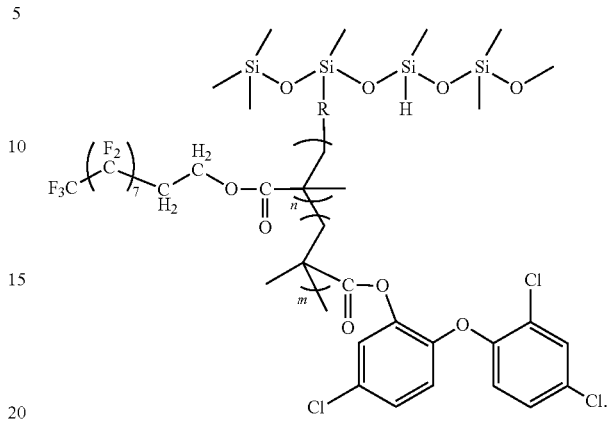

Synthesis Procedure

HMS-82Br, 20 g was dissolved in 150 ml of dry THF in a schlenk flask and 7.4 ml of heptadecafluoro decyl methacrylate was added to that followed by 0.32 g copper (I) bromide and 0.46 ml of pentamethyldiethylene triamine. The mixture was subjected to three freeze-thaw pump cycle and then allowed to polymerize at 90° C. for 8 h. After 8 h, 15.7 g of methylmethacrylate triclosan (Biocide) was added to the mixture under nitrogen atmosphere and the reaction was continued for 72 h. Polymerization was stopped by precipitating the mixture in methanol. Copper was removed by passing the polymer through a neutral alumina column.

Number average molecular weight, Mn=20000.

This polymer was then cross linked with divinyl polydimethyl siloxane, Mn=9000 using platinum catalyst to make the coating.

5) PDMS-co-PMHS-g-PMEMA-b-PHDFMA (Polydimethyl-co-polyhydromethylsiolxane-g-Polymethoxy Ethyl Methacrylate-b-Polyheptadecafluoro Decyl Methacrylate)

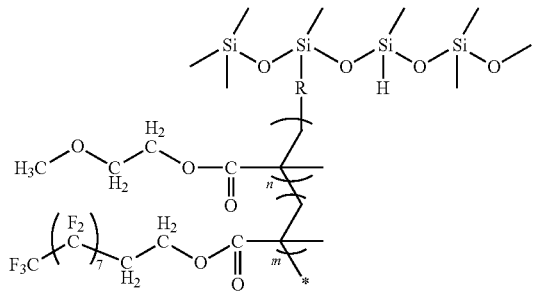

Synthesis Procedure

HMS-82Br, 10 g was dissolved in 100 ml of dry THF in a schlenk flask and 3.2 ml of Methoxy ethyl methacrylate was added to that followed by 0.08 g copper (I) bromide and 0.11 ml of pentamethyldiethylene trimine. The mixture was subjected to three freeze-thaw pump cycle and then allowed to polymerize at 90° C. for 72 h. After 72 h, 3.7 ml of heptadecafluoro decyl methacrylate was added to the reaction mixture and the reaction was continued for another 24 h. After the reaction, the polymerization was stopped by precipitating the mixture in methanol. Copper was removed by passing the polymer through a neutral alumina column.

Number average molecular weight, Mn=21000.

This polymer was then cross linked with divinyl polydimethyl siloxane, Mn=9000 using platinum catalyst to make the coating.

6) PDMS-co-PMHS-g-PHDFMA-b-PMEMA (Polydimethyl-co-polyhydromethylsioxane-g-Polyheptadecafluoro Decyl Methacrylate-b-Polymethoxy Ethyl Methacrylate

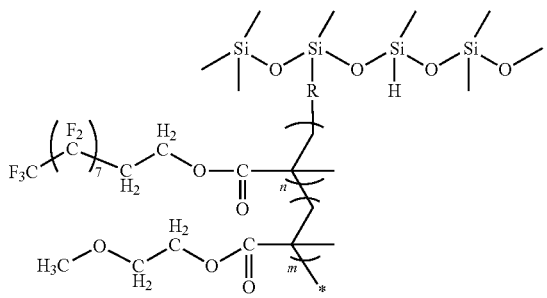

Synthesis Procedure

HMS-82Br, 10 g was dissolved in 100 ml of dry THF in a schlenk flask and 3.7 ml of heptadecafluoro decyl methacrylate was added to that followed by 0.08 g copper (I) bromide and 0.1 ml of pentamethyldiethylene trimine. The mixture was subjected to three freeze-thaw pump cycles and then allowed to polymerize at 90° C. for 8 h. After 8 h, 3.2 ml of Methoxy ethyl methacrylate was added to the reaction mixture and the reaction was continued for another 72 h. After the reaction, the polymerization was stopped by precipitating the mixture in methanol. Copper was removed by passing the polymer through a neutral alumina column.

Number average molecular weight, Mn=21000.

This polymer was then cross linked with divinyl polydimethyl siloxane, Mn=9000 using platinum catalyst to make the coating.

Bacterial Assays

The coatings were prepared by cross linking the polymers by divinyl terminated polydimethyl siloxane using platinum catalyst. These coatings were then tested by growing bacteria (*Halomonas pacifica*) on the surface of coatings. The results of these assays are shown in FIGS. 1-5.

FIG. 1 shows the results for a PDMS coating. More specifically, the horizontal rows of dishes in FIG. 1 show the test results for the following coatings. The contact angle of the PDMS coating in rows 2 and 3 is 103.

Row 1—PMMA (Polymethylmethacrylate) (top row in FIG. 1)
Row 2—Experimental (PDMS)
Row 3—Experimental after water jet-25Psi (PDMS)
Row 4—Intersleek Topcoat (Commercial coating)

Figure 2:
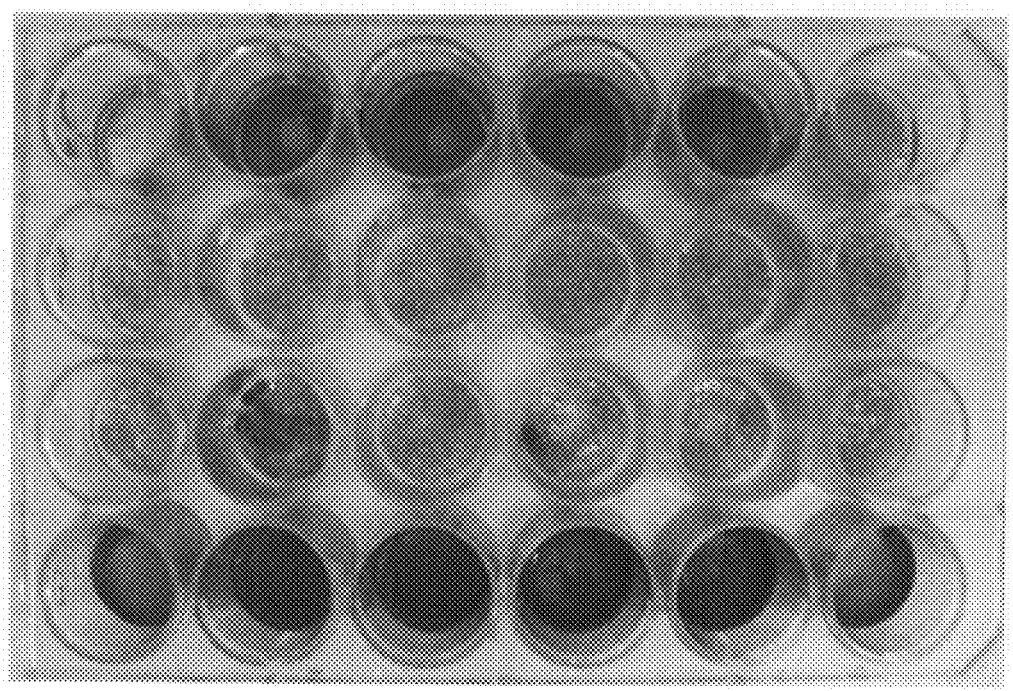
FIG. 2 is a picture of a bacterial assay of a PDMS-co-PMHS-g-PHDFMA coating.

FIG. 2 shows the results for a PDMS-co-PMHS-g-PHDFMA coating. The specific coating applied to the dishes is shown below. The contact angle of the PDMS-co-PMHS-g-PHDFMA coating is 120.

Row 1—PMMA (Polymethylmethacrylate)
Row 2—Experimental (PDMS-co-PMHS-g-PHDFMA)
Row 3—Experimental after water jet-25psi (PDMS-co-PMHS-g-PHDFMA)
Row 4—Intersleek Topcoat (Commercial coating)

Figure 3:
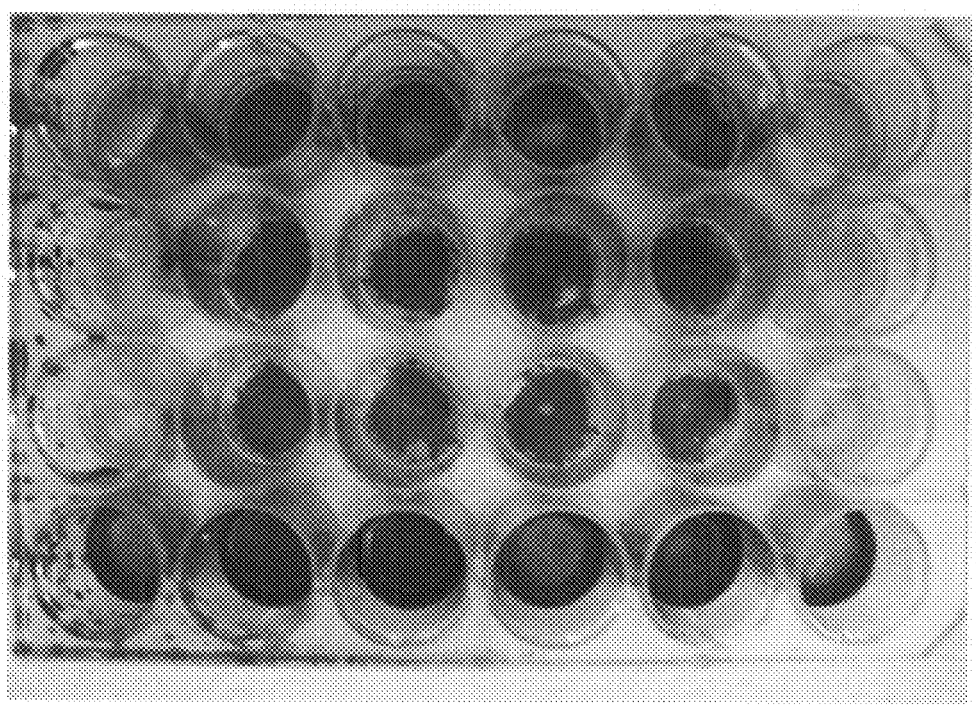
FIG. 3 is a picture of a bacterial assay of a PDMS-co-PMHS-g-PMEMA coating.

FIG. 3 shows the results for a PDMS-co-PMHS-g-PMEMA coating. The specific coating applied to the dishes is shown below. The contact angle of the PDMS-co-PMHS-g-PMEMA coating is 107.

Row 1—PMMA (Polymethylmethacrylate)
Row 2—Experimental (PDMS-co-PMHS-g-PMEMA)
Row 3—Experimental after water jet-25Psi (PDMS-co-PMHS-g-PMEMA)
Row 4—Intersleek Topcoat (Commercial coating)

Figure 4:
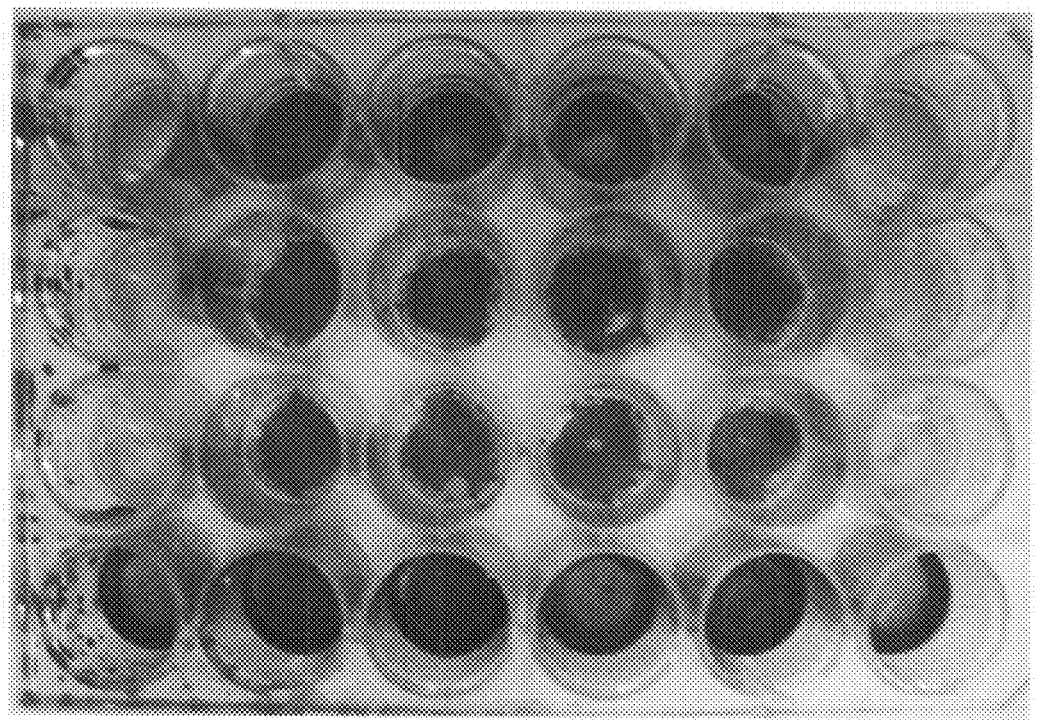
FIG. 4 is a picture of a bacterial assay of a PDMS-co-PMHS-g-PMEMA-b-Biocide coating.

FIG. 4 shows the results for a PDMS-co-PMHS-g-PMEMA-b-Biocide coating. The specific coating applied to the dishes is shown below. The contact angle of the PDMS-co-PMHS-g-PMEMA-b-Biocide coating is 105.

Row 1—PMMA (Polymethylmethacrylate)
Row 2—Experimental (PDMS-co-PMHS-g-PMEMA-b-Biocide)
Row 3—Experimental after water jet-25Psi (PDMS-co-PMHS-g-PMEMA-b-Biocide)
Row 4—Intersleek Topcoat (Commercial coating)

Figure 5:
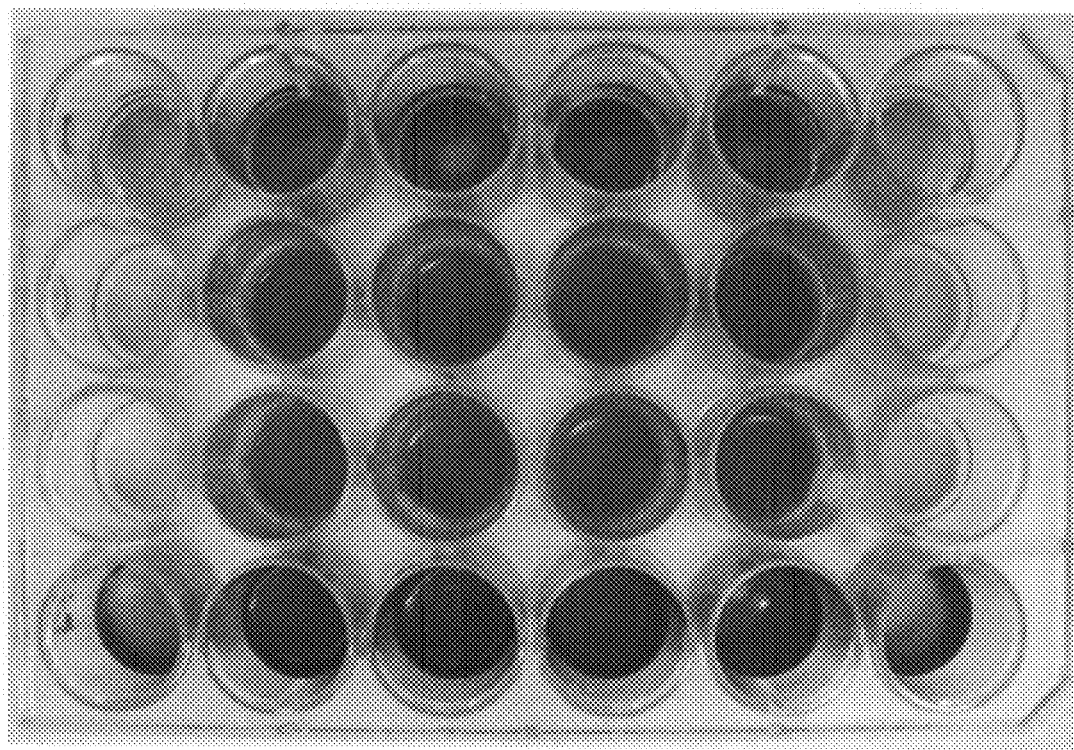
FIG. 5 is a picture of a bacterial assay of a PDMS-co-PMHS-g-Biocide coating.

FIG. 5 shows the results for a PDMS-co-PMHS-g-Biocide coating. The specific coating applied to the dishes is shown below. The contact angle of the PDMS-co-PMHS-g-Biocide coating is 108.

Row 1—PMMA (Polymethylmethacrylate)
Row 2—Experimental (PDMS-co-PMHS-g-Biocide)
Row 3—Experimental after water jet-25 psi (PDMS-co-PMHS-g-Biocide)
Row 4—Intersleek Topcoat (Commercial coating)

Figure 6:
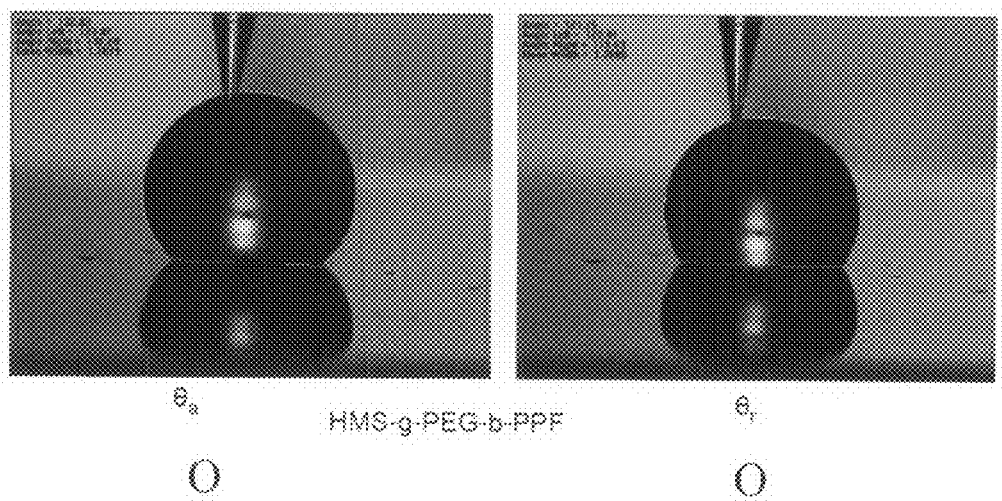
FIG. 6 shows the contact angle of one embodiment of HMS-g-PEG-b-PPF.

The contact angle for the various coatings is shown below. FIG. 6 shows the advancing contact angle, θa, and the receding contact angle, θr, for HMS-g-PEG-b-PPF.

| Contact Angle: | | | | |
|---|---|---|---|---|
| 1. PDMS | 2. HMS-g-Bio | 3. HMS-g-PEG | 4. HMS-g-PPF | 5. HMS-g-PS |
| $\theta_a$ = 101 | $\theta_a$ = 102 | $\theta_a$ = 100 | θa = 118 | θa = 104 |
| $\theta_r$ = 99 | $\theta_r$ = 93 | θr = 90 | θr = 112 | θr = 100 |
| 6. HMS-g-PEG-b-Bio | 7. HMS-g-PPF-b-Bio | 8. HMS-g-PPF-b-PEG | 9. HMS-g-PEG-b-PPF | |
| $\theta_a$ = 101 | $\theta_a$ = 134 | $\theta_a$ = 122 | $\theta_a$ = 133 | |
| $\theta_r$ = 95 | $\theta_r$ = 125 | $\theta_r$ = 113 | $\theta_r$ = 122 | |

Figure 7:
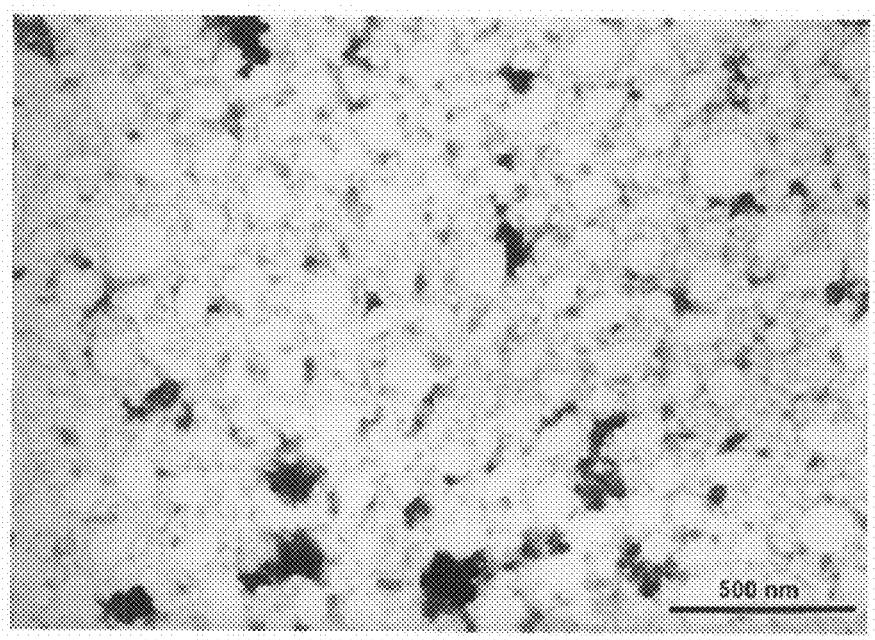
FIG. 7 is a transmission electron microscopy (TEM) image of HMS-g-Biocide.
Figure 8:
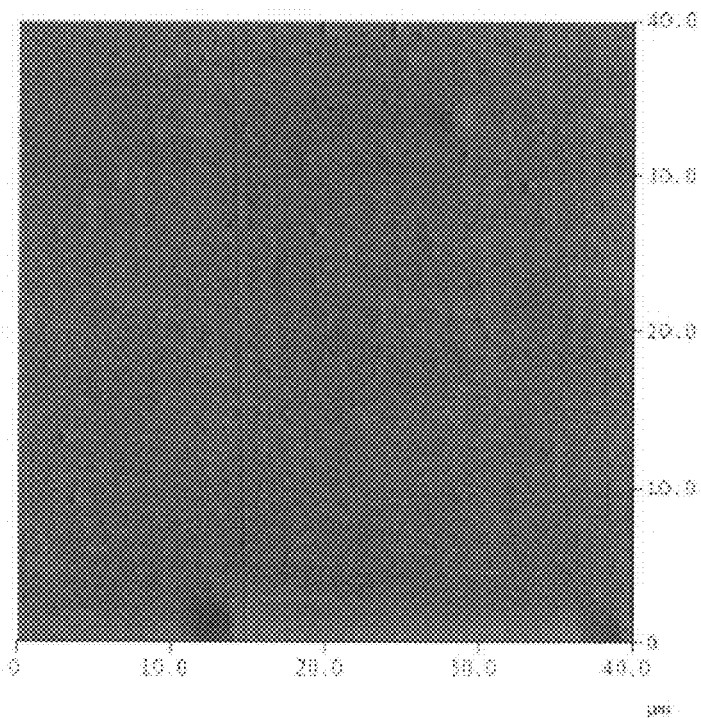
FIG. 8 is an atomic force microscopy image of HMS-g-Biocide.
Figure 9:
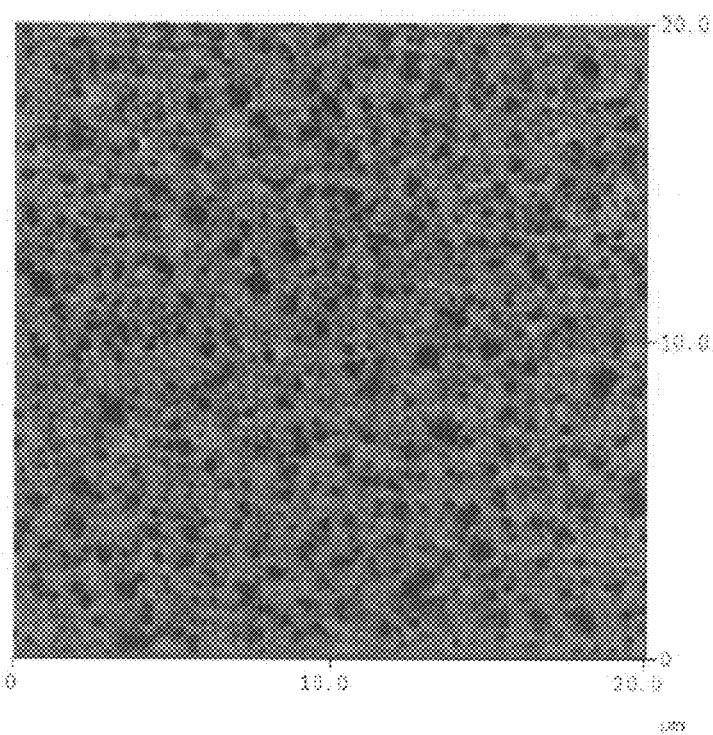
FIG. 9 is an atomic force microscopy image of PDMS-g-PEG-b-Biocide.
Figure 10:
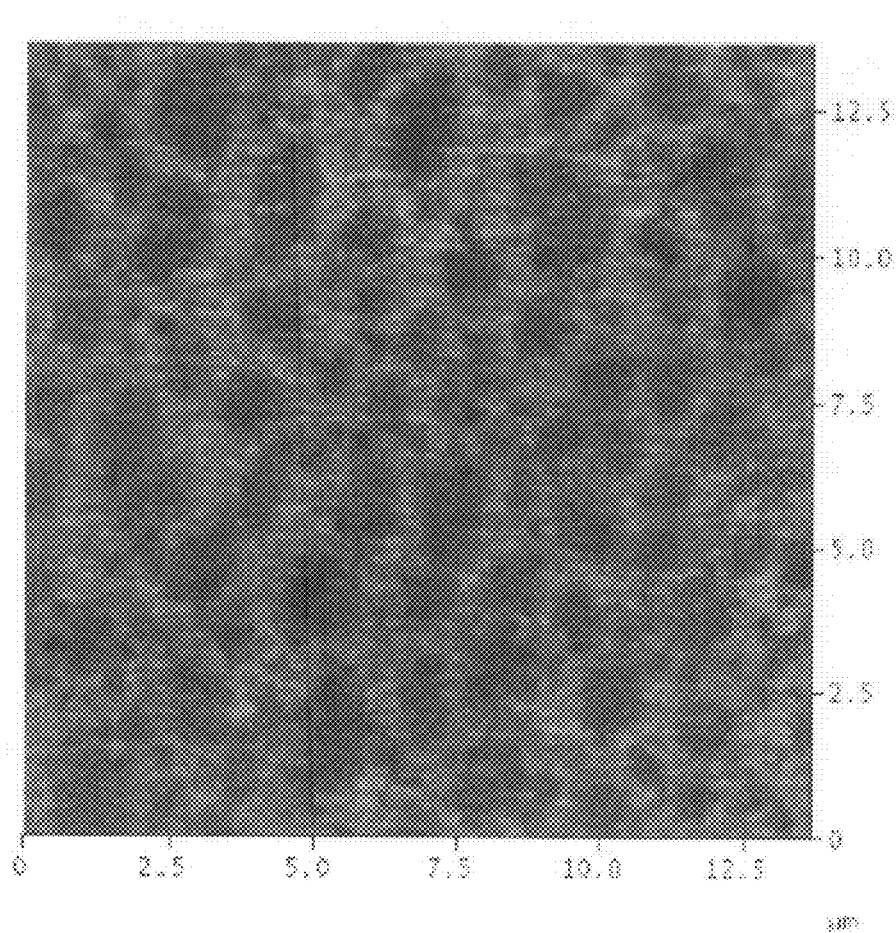
FIG. 10 is an atomic force microscopy image of HMS-g-PPF-b-PEG.

Referring to FIGS. 7-10, the morphology of some of the coatings is shown. FIG. 7 shows a transmission electron microscopy (TEM) image of HMS-g-Biocide. FIG. 8 shows an atomic force microscopy (AFM) image of HMS-g-Biocide. FIG. 9 shows an AFM image of PDMS-g-PEG-b-Biocide. FIG. 10 shows an AFM image of HMS-g-PPF-b-PEG.

As used herein, (i.e., in the claims and the specification), articles such as "the," "a," and "an" can connote the singular or plural. Also, as used herein, the word "or" when used without a preceding "either" (or other similar language indicating that "or" is unequivocally meant to be exclusive—e.g., only one of x or y, etc.) shall be interpreted to be inclusive, that is "or" when it appears alone shall mean both "and" and "or." Likewise, as used herein, the term "and/or" shall also be interpreted to be inclusive in that the term shall mean both "and" and "or." In situations where "and/or" or "or" are used as a conjunction for a group of three or more items, the group should be interpreted to include one item alone, all of the items together, or any combination or number of the items. Moreover, terms used in the specification and claims such as have, having, include, and including should be construed to be synonymous with the terms comprise and comprising.

Unless otherwise indicated, all numbers or expressions, such as those expressing dimensions, physical characteristics, etc. used in the specification are understood as modified in all instances by the term "about." At the very least, and not as an attempt to limit the application of the doctrine of equivalents to the claims, each numerical parameter recited in the specification or claims which is modified by the term "about" should at least be construed in light of the number of recited significant digits and by applying ordinary rounding techniques. Moreover, all ranges disclosed herein are to be understood to encompass any and all subranges subsumed therein. For example, a stated range of 1 to 10 should be considered to include any and all subranges between and inclusive of the minimum value of 1 and the maximum value of 10; that is, all subranges beginning with a minimum value of 1 or more and ending with a maximum value of 10 or less (e.g., 5.5 to 10).

What is claimed is:

1. An anti-fouling material comprising a random or block copolymer having a formula:

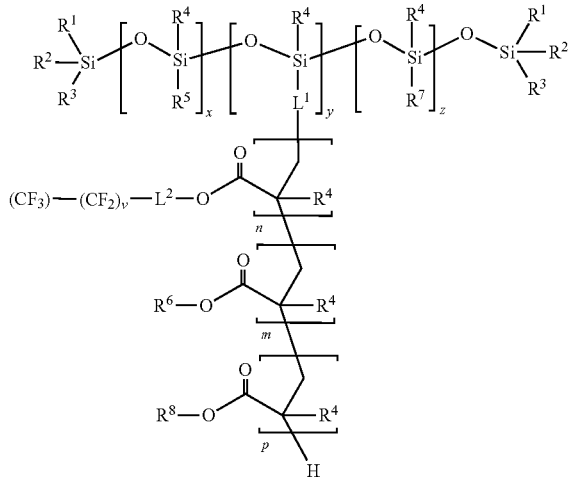

wherein x is an integer from 0 to 100;
y is an integer from 1 to 100;
z is an integer from 0 to 100;
n is an integer from 0 to 50;
m is an integer from 0 to 50;
p is an integer from 0 to 50;
v is an integer from 1 to 25;
at least one of n, m, or p is not 0;
$L^1$ and $L^2$ are linking groups;
$R^1$, $R^2$, and $R^3$, are independently $C_1$-$C_{10}$ alkyl, cyclopentyl, cyclohexyl, benzyl, toluyl, xylyl or phenyl;
$R^4$ is hydrogen, $C_1$-$C_{10}$ alkyl, cyclopentyl, cyclohexyl, benzyl, toluyl, xylyl or phenyl;
$R^5$ is $C_1$-$C_{10}$ alkyl, cyclopentyl, cyclohexyl, benzyl, toluyl, xylyl, phenyl, or a cross linking group;
$R^7$ is hydrogen, $C_1$-$C_{10}$ alkyl, cyclopentyl, cyclohexyl, benzyl, toluyl, xylyl, phenyl, or a cross linking group;
$R^6$ and $R^8$ are independently a biocidal group that is toxic to organisms that cause fouling in an aquatic environment; a fouling release group; a texturizing group; or combination thereof; and at least one of $R^6$ and $R^8$ includes the biocidal group; with the proviso that if $R^6$ includes the biocidal group, m is not 0, and if $R^8$ includes the biocidal group, p is not 0.

2. The anti-fouling material of claim 1 wherein $R^4$ is methyl.

3. The anti-fouling material of claim 1 wherein the polysiloxane based copolymer is a random copolymer and the polymethacrylate based copolymer which is grafted onto the polysiloxane is a block copolymer.

4. The anti-fouling material of claim 1 wherein at least one of $R^6$ or $R^8$ includes an alkoxy alkyl group.

5. The anti-fouling material of claim 1 wherein the biocidal group includes triclosan.

6. The anti-fouling material of claim 1 wherein v is 7.

7. The anti-fouling material of claim 1 wherein $R^7$ is hydrogen; and the copolymer has a number average molecular weight (Mn) of about 5000 to 50,000.

8. The anti-fouling material of claim 1 wherein $L^1$ is:

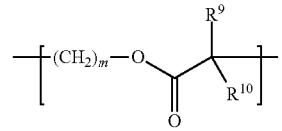

wherein $R^9$ and $R^{10}$ are independently hydrogen or lower alkyl and m is an integer from 2 to 6.

9. The anti-fouling material of claim 1 wherein the random or block copolymer has a formula:

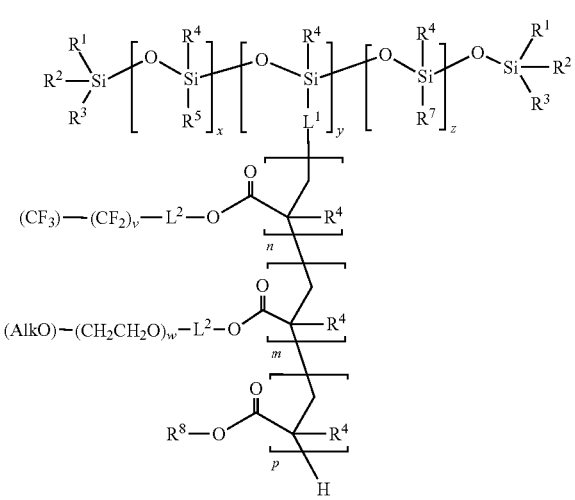

wherein x is an integer from 0 to 100;
y is an integer from 1 to 100;
z is an integer from 0 to 100;
n is an integer from 0 to 50;
m is an integer from 0 to 50;
p is an integer from 0 to 50;
v is an integer from 1 to 25;
w is an integer from 0 to 25;
at least one of n, m, or p is not 0;
$L^1$ and $L^2$ are linking groups;
$R^1$, $R^2$, and $R^3$, are independently $C_1$-$C_{10}$ alkyl, cyclopentyl, cyclohexyl, benzyl, toluyl, xylyl or phenyl;
$R^4$ is hydrogen, $C_1$-$C_{10}$ alkyl, cyclopentyl, cyclohexyl, benzyl, toluyl, xylyl or phenyl;
$R^5$ is $C_1$-$C_{10}$ alkyl, cyclopentyl, cyclohexyl, benzyl, toluyl, xylyl, phenyl, or a cross linking group;
$R^7$ is hydrogen, $C_1$-$C_{10}$ alkyl, cyclopentyl, cyclohexyl, benzyl, toluyl, xylyl, phenyl, or a cross linking group;
$R^8$ is the biocidal group.

10. The anti-fouling material of claim 1 wherein the biocidal group comprises a tetracycline group, a triclosan group, an ammonium salt or a pyridinium salt.

11. The anti-fouling material of claim 1 wherein the random or block copolymer has a contact angle of at least about 105 degrees.

12. The anti-fouling material of claim 1 wherein the cross linking group comprises an epoxy, hydroxy, amino, olefin, aldehyde, carboxylic or ester group, which is capable of undergoing reaction when brought into contact with a curing agent.

13. The anti-fouling material of claim 1 wherein at least one of $R^6$ and $R^8$ comprises a perfluoroalkyl group; a polyether group; an alkoxy alkyl group; or a liquid crystalline group.

14. The anti-fouling material of claim 1 wherein n and m are not 0;
$L^2$ is —$CH_2$—$CH_2$—;
V is 7;
$R^6$ is a methoxy ethyl group; and
$R^8$ is the biocidal group.

15. The anti-fouling material of claim 1 wherein
$L^2$ is —$CH_2$—$CH_2$—;
$R^6$ is a methoxy ethyl group;
$R^8$ is the biocidal group; and
at least one of n and m is not 0.

16. The anti-fouling material of claim 1 wherein the random or block copolymer has a contact angle of at least about 115 degrees.

17. The anti-fouling material of claim 1 wherein the copolymer includes a polysiloxane backbone and polymethacrylate based block copolymers grafted to the polysiloxane backbone; $R^8$ comprises the biocidal group; and $R^6$ comprises a polyether group or an alkoxy alkyl group.

18. The anti-fouling material of claim 1 wherein the copolymer includes a polysiloxane backbone and polymethacrylate based block copolymers grafted to the polysiloxane backbone; $R^6$ comprises the biocidal group; and $R^8$ comprises a perfluoroalkyl group.

19. The anti-fouling material of claim 1 wherein at least one of $R^6$ and $R^8$ comprises a perfluoroalkyl group; a polyether group; an alkoxy alkyl group; or a combination thereof.

20. The anti-fouling material of claim 1 wherein
$R^1$, $R^2$, $R^3$, $R^4$ and $R^5$ are methyl;
$R^7$ is hydrogen or methyl;
$R^6$ is an alkoxy alkyl group; and
$R^8$ comprises the biocidal group.

21. The anti-fouling material of claim 20 wherein $R^6$ is a methoxy ethyl group and $R^8$ comprises a triclosan group.

22. The anti-fouling material of claim 1 wherein
$R^1$, $R^2$, $R^3$, $R^4$ and $R^5$ are methyl;
$R^7$ is hydrogen or methyl;
$R^6$ comprises a perfluoroalkyl group; and
$R^8$ comprises the biocidal group.

23. The anti-fouling material of claim 1 wherein $R^1$, $R^2$, $R^3$, $R^4$ and $R^5$ are methyl;
$R^7$ is hydrogen or methyl; and
$R^8$ comprises a triclosan group.

24. The anti-fouling material of claim 1 wherein $R^1$, $R^2$, $R^3$, $R^4$ and $R^5$ are methyl;
$R^7$ is hydrogen or methyl;
$R^6$ comprises the biocidal group; and
$R^8$ comprises a perfluoroalkyl group; a polyether group; an alkoxy alkyl group; or a combination thereof.

* * * * *